US007543195B2

(12) United States Patent
Nguyen et al.

(10) Patent No.: US 7,543,195 B2
(45) Date of Patent: Jun. 2, 2009

(54) METHOD AND SYSTEM FOR MANAGING TIME-OUT EVENTS IN A STORAGE AREA NETWORK

(75) Inventors: Tuan Nguyen, San Jose, CA (US);
Rahim Ibrahim, Mountain View, CA (US); Nghiep Tran, San Jose, CA (US)

(73) Assignee: NetApp, Inc., Sunnyvale, CA (US)

( * ) Notice: Subject to any disclaimer, the term of this patent is extended or adjusted under 35 U.S.C. 154(b) by 1492 days.

(21) Appl. No.: 10/695,888

(22) Filed: Oct. 28, 2003

(65) Prior Publication Data
US 2007/0022192 A1    Jan. 25, 2007

Related U.S. Application Data

(60) Provisional application No. 60/422,109, filed on Oct. 28, 2002.

(51) Int. Cl.
*G06F 11/00* (2006.01)
(52) U.S. Cl. .......................... 714/51; 709/223
(58) Field of Classification Search ............ 714/4, 714/39, 47, 50, 51, 55; 709/223, 224; 711/154, 711/163
See application file for complete search history.

(56) References Cited

U.S. PATENT DOCUMENTS

| 6,421,723 | B1 * | 7/2002 | Tawil | 709/224 |
| 6,748,559 | B1 * | 6/2004 | Pfister et al. | 714/56 |
| 7,016,971 | B1 * | 3/2006 | Recio et al. | 709/233 |
| 7,171,484 | B1 * | 1/2007 | Krause et al. | 709/232 |
| 2007/0081539 | A1 * | 4/2007 | Shaikli | 370/394 |

* cited by examiner

*Primary Examiner*—Dieu-Minh Le
(74) *Attorney, Agent, or Firm*—Wiesner & Associates; Leland Wiesner (57) ABSTRACT

A method and system to enter a time out interval in a storage area network includes identifying a time slot in a sequence of time slots to insert a time out event for the event in the storage area network, determining if other events in the storage network already have corresponding other time out events in the same time slot and inserting the time out event for the event in the identified time slot along with the other time out events and the other corresponding events. Monitoring time out intervals for the events includes receiving a request to determine if events in the storage area network have timed out, identifying events associated with a current time slot, determining if the identified current time slot is empty, removing events from the identified current time slot in response to the determination and notifying a time-out handler to perform appropriate time-out related processing.

38 Claims, 9 Drawing Sheets

METHOD AND SYSTEM FOR MANAGING TIME-OUT EVENTS IN A STORAGE AREA NETWORK

CROSS-REFERENCE TO RELATED APPLICATIONS

This application claims priority to U.S. Provisional Application No. 60/422,109, filed Oct. 28, 2002 and titled "Apparatus and Method for Enhancing Storage Processing in a Network-Based Storage Virtualization System", which is incorporated herein by reference.

This application also relates to the subject matter disclosed in the co-pending U.S. application Ser. No. 10/695,887 by Richard Meyer, et al., titled "Method and System for Dynamic Expansion and Contraction of Nodes in a Storage Area Network", co-pending U.S. application Ser. No. 10/695,889 by Gautam Ghose, et al., titled "Failure Analysis Method and System for Storage Area Networks", co-pending U.S. Pat. No. 7,080,229 by Rush Manbert, et al., titled "Method and System for Strategy Driven Provisioning of Storage in a Storage Area Network", filed concurrently herewith.

BACKGROUND OF THE INVENTION

Storage area networks, also known as SANs, facilitate sharing of storage devices with one or more different host server computer systems and applications. Fibre channel switches (FCSs) can connect host servers with storage devices creating a high speed switching fabric. Requests to access data pass over this switching fabric and onto the correct storage devices through logic built into the FCS devices. Host servers connected to the switching fabric can quickly and efficiently share blocks of data stored on the various storage devices connected to the switching fabric.

Storage devices can share their storage resources over the switching fabric using several different techniques. For example, storage resources can be shared using storage controllers that perform storage virtualization. This technique can make one or more physical storage devices, such as disks, which comprise a number of logical units (sometimes referred to as "physical LUNs") appear as a single virtual logical unit or multiple virtual logical units, also known as VLUNs. By hiding the details of the numerous physical storage devices, a storage virtualization system having one or more such controllers advantageously simplifies storage management between a host and the storage devices. In particular, the technique enables centralized management and maintenance of the storage devices without involvement from the host server.

In many instances it is advantageous to place the storage virtualization controller(s) in the middle of the fabric, with the host servers and controllers arranged at the outer edges of the fabric. Such an arrangement is generally referred to as a symmetric, in-band, or in-the-data-path configuration. It is often the case that many different components distributed over the storage area network operate together to fulfill a particular request and deliver the storage. Generally, these components can deliver requested data or data processing results within a time frame unless an error or other malfunction has occurred. Accordingly, many processes operating with the storage network have a time out interval that the process needs to complete the operation or receive a time out event. This time out event is used to indicate that the event on the storage network has failed and needs to be restarted or investigated.

Unfortunately, large complex and distributed storage networks have many potential time out events that may occur during a particular process. These time out events being monitored are too numerous for conventional time out processing to monitor and keep track of in an orderly fashion. As a result, if the time out events are not serviced regularly and properly, the system may experience a variety of unacceptable outcomes including: data corruption, deadlock events and overall failure to operate. For these and other reasons, it is therefore desirable to create a time out operation and mechanism capable of handling a large volume of possible time out events in a storage network scalable to the system size.

BRIEF DESCRIPTION OF THE DRAWINGS

The features of the present invention and the manner of attaining them, and the invention itself, will be best understood by reference to the following detailed description of implementations of the invention, taken in conjunction with the accompanying drawings, wherein.

SUMMARY OF THE INVENTION

In one implementation, the present invention provides a method for entering a time out interval for an event in a storage area network. Entering the time out interval for the event includes identifying a time slot in a sequence of time slots to insert a time out event for the event in the storage area network, determining if other events in the storage network already have corresponding other time out events in the same time slot and inserting the time out event for the event in the identified time slot along with the other time out events and the corresponding other events.

In another implementation, the present invention provides a method of removing a time out event being monitored for an event in a storage area network. The removal operations include receiving a request to remove the time out event corresponding to an event in the storage area network, identifying a time slot in a sequence of time slots to remove the time out event for the event in the storage area network and removing the time out event for the event in the identified time slot while the other time out events and the other corresponding events continue being monitored.

Yet another implementation of the present invention includes a method of monitoring time out intervals for events in the storage area network. The monitoring includes receiving a request to determine if one or more events in the storage area network have timed out, identifying a set of events associated with a current time slot in a sequence of time slots, determining if the identified set of events in the current time slot is empty, removing one or more events from the identified set of events associated with the current time slot in response to the determination and notifying a time-out handler associated with each of the one more events removed from the time slot to perform appropriate time-out related processing.

DETAILED DESCRIPTION

Aspects of the present invention provides a high-performance and scalable time out manager suitable for use in large scale storage area networks. This time out manager of the present invention is advantageous for at least one or more of the following reasons described herein. The time out operations are scalable and handled using flexible and dynamic data structures for storing and organizing time out events. Instead of treating each time out individually, time out events that expire or elapse at the same time intervals are grouped together. Different time out events are not only processed together but, in some cases, may potentially be evaluated in parallel. For example, a data set or file striped across several different storage drives may time out in parallel if the data set cannot subsequently be retrieved or written to the storage drives.

Further, another advantage of the present invention provides an increased granularity for monitoring the time out events on the storage area network. The time out interval is specified for each event on the SAN and placed in a sequence of time slots best suited for the requested time out interval. Several different data structures are created for handling the time out events and each may operate on a different time interval. In one sequence of time slots, the time interval between each time slot may be proportional to three-times the hardware clock frequency of a SAN controller while another sequence of time slots may be based upon a time interval proportional to eight-times the hardware frequency in the SAN controller. Many different time slot sequences can be used for monitoring different time out events according to the needed granularity for processing the events.

Figure 1:
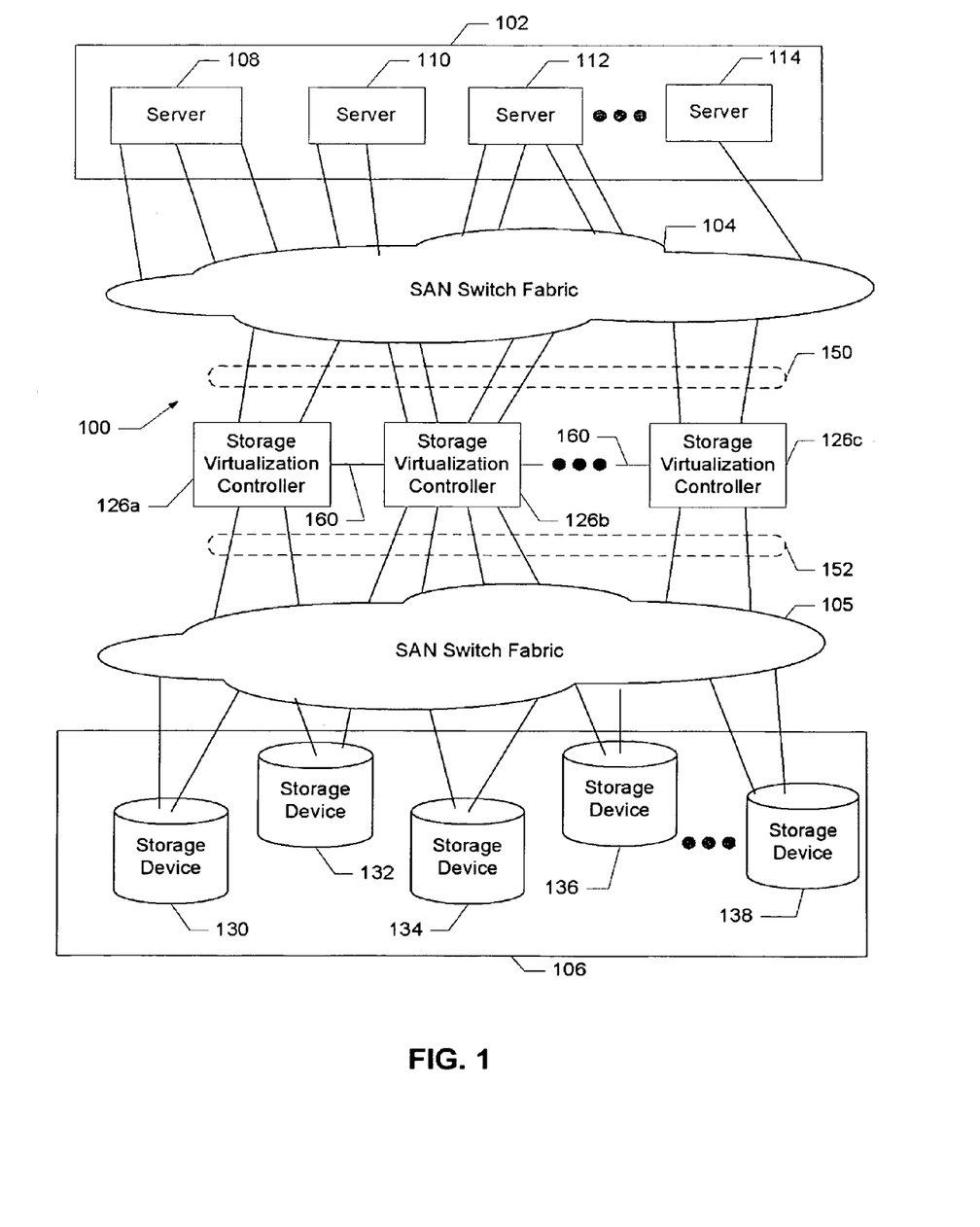
FIG. 1 is an exemplary system block diagram of the logical relationship between host servers, storage devices, and a storage area network (SAN) implemented using a switching fabric along with an implementation of the present invention.

Referring to the exemplary configuration in FIG. 1, a storage area network (SAN) 100 may include one or more SAN switch fabrics, such as fabrics 104,105. Fabric 104 is connected to hosts 102, while fabric 105 is connected to storage devices 106. At least one storage virtualization controller 126 is inserted in the midst of SAN 100, and connected to both fabrics 104,105 to form a symmetric, in-band storage virtualization configuration. In an in-band configuration, communications between server devices 102 and storage devices 106 pass through controller 126 for performing data transfer in accordance with the present invention.

Host servers 102 are generally communicatively coupled (through fabric 104) via links 150 to individual upstream processing elements (UPE) of controller 126. In an alternate configuration, one or more host servers may be directly coupled to controller 126, instead of through fabric 104. Controller 126 includes at least one UPE for each server 102 (such as host servers 108,110,112,114) connected to the controller 126. As will be discussed subsequently in greater detail, storage virtualization controller 126 appears as a virtual logical unit (VLUN) to each host server.

Storage devices 106 are communicatively coupled (through fabric 105) via links 152 to individual downstream processing elements (DPEs) of controller 126. In an alternate configuration, one or more storage devices may be directly coupled to controller 126, instead of through fabric 105. Controller 126 includes at least one DPE for each storage device 106 (such as storage devices 130,132,134,136,138) connected to the controller 126. Controller 126 appears as an initiator to each storage device 106. Multiple controllers 126 may be interconnected by external communications link 160. Within each controller 126, time out processing modules are designed in accordance with the present invention along with supporting hardware and software needed to implement the present invention. As described later herein, these time out processing modules provide flexible monitoring of time out events for a variety of events at different time intervals while maintaining accuracy and high availability.

Figure 2:
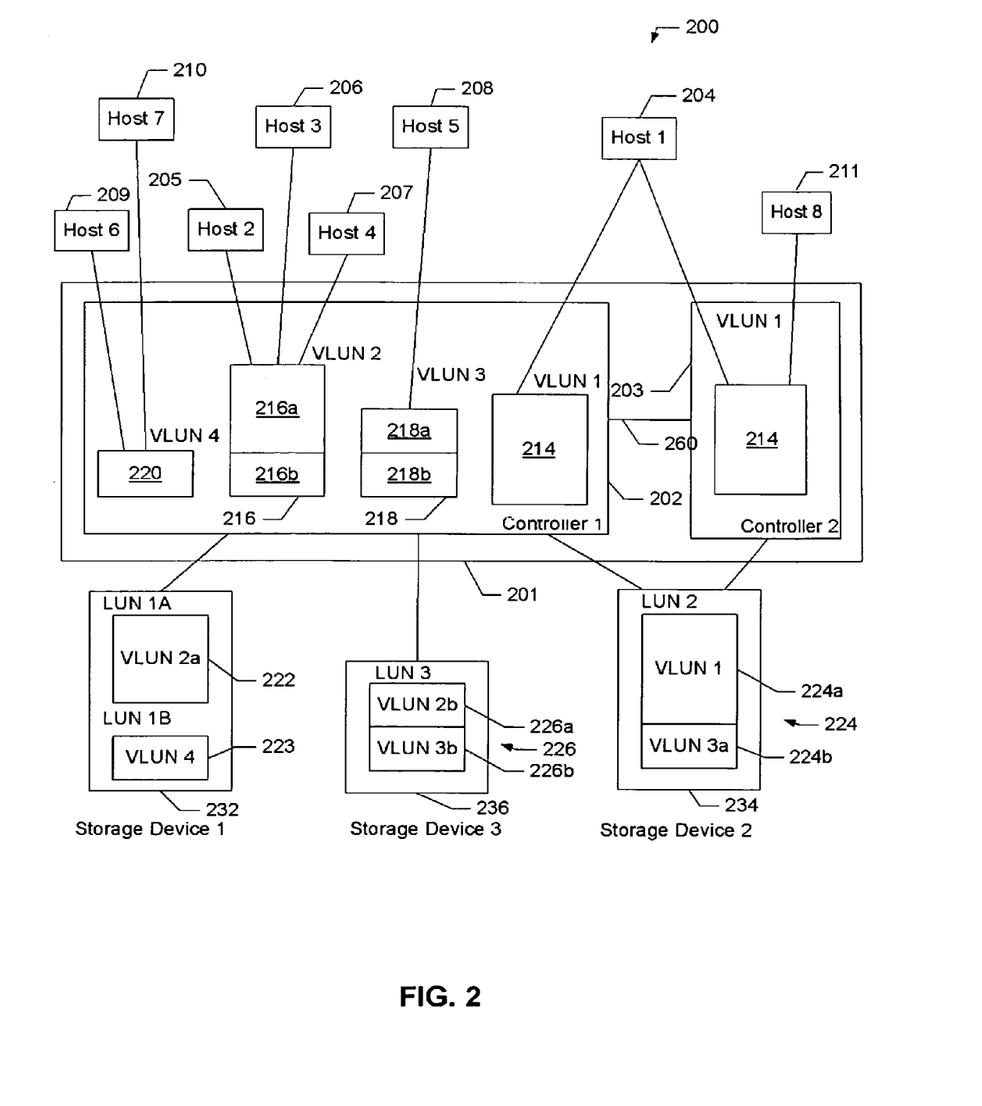
FIG. 2 is an exemplary system block diagram illustrative of the relationship provided by a storage virtualization controller between virtual logical units and logical units on physical storage devices, in accordance with an implementation of the present invention.

Considering now the virtualization of storage provided by an implementation of the present invention, and with reference to the exemplary SAN 200 of FIG. 2, a storage virtualization system includes an exemplary storage virtualization controller arrangement 201. Controller arrangement 201 includes, for illustrative purposes, two storage virtualization controllers 202,203 interconnected via communication link 260. Controller1 202 has been configured to provide four virtual logical units 214,216,218,220 associated with hosts 204-210, while controller2 203 has been configured to provide one virtual logical unit 214 associated with hosts 204, 211. In the general case, a virtual logical unit (VLUN) includes N "slices" of data from M physical storage devices, where a data "slice" is a range of data blocks. In operation, a host requests to read or write a block of data from or to a VLUN. Through controller1 202 of this exemplary configuration, host1 204 is associated with VLUN1 214; host2 205, host3 206, and host4 207 are associated with VLUN2 216; host5 208 is associated with VLUN3 218, host6 209 and host7 210 are associated with VLUN4 220. Through controller2 203, host1 204 and host8 211 are also associated with VLUN1 214. It can be seen that host1 204 can access VLUN1 214 through two separate paths, one through controller1 202 and one path through controller2 203.

A host 204-211 accesses it's associated VLUN by sending commands to the controller arrangement 201 to read and write virtual data blocks in the VLUN. Controller arrangement 201 maps the virtual data blocks to physical data blocks on individual ones of the storage devices 232,234,236, according to a preconfigured mapping arrangement. Controller arrangement 201 then communicates the commands and transfers the data blocks to and from the appropriate ones of the storage devices 232,234,236. Each storage device 232, 234,236 can include one or more physical LUNs; for example, storage device 1 232 has two physical LUNs, LUN 1A 222 and LUN 1B 223.

To illustrate further the mapping of virtual data blocks to physical data blocks, all the virtual data blocks of VLUN1 214 are mapped to a portion 224a of the physical data blocks LUN2 224 of storage device 234. Since VLUN2 216 requires more physical data blocks than any individual storage device 232,234,236 has available, one portion 216a of VLUN2 216 is mapped to the physical data blocks of LUN1A 222 of storage device 232, and the remaining portion 216b of VLUN2 216 is mapped to a portion 226a of the physical data blocks of LUN3 226 of storage device 236. One portion 218a of VLUN3 218 is mapped to a portion 224b of LUN2 224 of storage device 234, and the other portion 218b of VLUN3 218 is mapped to a portion 226b of LUN3 226 of storage device 236. It can be seen with regard to VLUN3 that such a mapping arrangement allows data block fragments of various storage devices to be grouped together into a VLUN, thus advantageously maximizing utilization of the physical data blocks of the storage devices. All the data blocks of VLUN4 220 are mapped to LUN1B 223 of storage device 232.

While the above-described exemplary mapping illustrates the concatenation of data block segments on multiple storage devices into a single VLUN, it should be noted that other mapping schemes, including but not limited to striping and replication, can also be utilized by the controller arrangement 201 to form a VLUN. Additionally, the storage devices 232, 234, 236 may be heterogeneous; that is, they may be from different manufacturers or of different models, and may have different storage sizes, capabilities, architectures, and the like. Similarly, the hosts 204-210 may also be heterogeneous; they may be from different manufacturers or of different models, and may have different processors, operating systems, networking software, applications software, capabilities, architectures, and the like.

It can be seen from the above-described exemplary mapping arrangement that different VLUNs may contend for access to the same storage device. For example, VLUN2 216 and VLUN4 220 may contend for access to storage device 1 232; VLUN1 214 and VLUN3 218 may contend for access to storage device 2 234; and VLUN2 216 and VLUN3 218 may contend for access to storage device 3 236. The storage virtualization controller arrangement 201 according to an implementation of the present invention performs the mappings and resolves access contention, while allowing data transfers between the host and the storage device to occur at wire-speed.

Before considering the various elements of the storage virtualization system in detail, it is useful to discuss, with reference to FIGS. 1 and 2, the format and protocol of the storage requests that are sent over SAN 200 from a host to a storage device through the controller arrangement 201. Many storage devices frequently utilize the Small Computer System Interface (SCSI) protocol to read and write the bytes, blocks, frames, and other organizational data structures used for storing and retrieving information. Hosts access a VLUN using these storage devices via some implementation of SCSI commands; for example, layer 4 of Fibre Channel protocol. However, it should be noted that the present invention is not limited to storage devices or network commands that use SCSI protocol.

Storage requests may include command frames, data frames, and status frames. The controller arrangement 201 processes command frames only from hosts, although it may send command frames to storage devices as part of processing the command from the host. A storage device generally does not send command frames to the controller arrangement 201, but instead sends data and status frames. A data frame can come from either host (in case of a write operation) or the storage device (in case of a read operation).

In many cases one or more command frames is followed by a large number of data frames. Command frames for read and write operations include an identifier that indicates the VLUN that data will be read from or written to. A command frame containing a request, for example, to read or write a 50 kB block of data from or to a particular VLUN may then be followed by 25 continuously-received data frames each containing 2 kB of the data. Since data frames start coming into the controller 203 only after the controller has processed the command frame and sent a go-ahead indicator to the host or storage device that is the originator of the data frames, there is no danger of data loss or exponential delay growth if the processing of a command frame is not done at wire-speed; the host or the storage device will not send more frames until the go-ahead is received. However, data frames flow into the controller 203 continuously once the controller gives the go-ahead. If a data frame is not processed completely before the next one comes in, the queuing delays will grow continuously, consuming buffers and other resources. In the worst case, the system could run out of resources if heavy traffic persists for some time.

Figure 3:
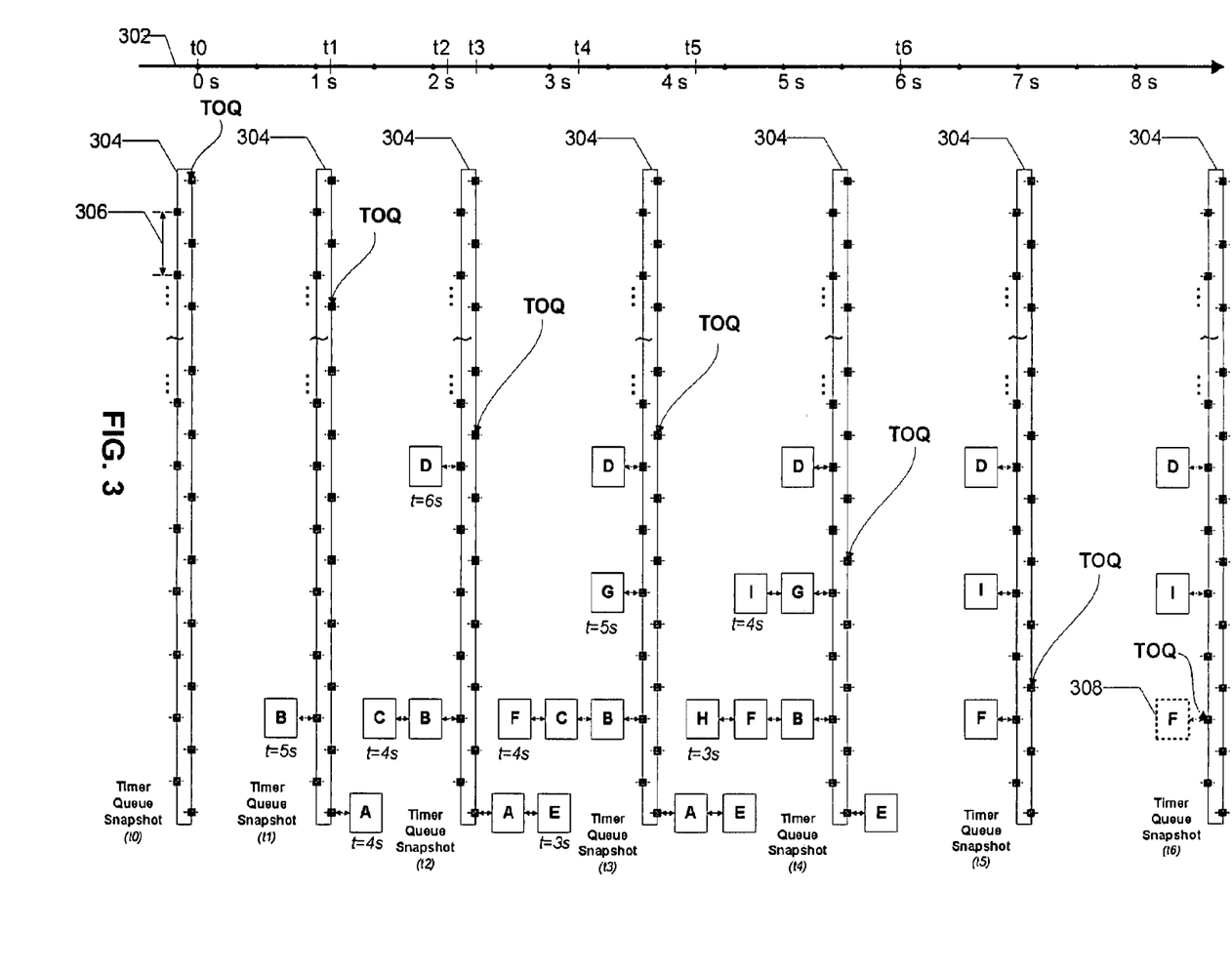
FIG. 3 provides a schematic block diagram of a sequence of time slots and the group of corresponding time out events in the queue at these different times in accordance with one implementation of the present invention.

FIG. 3 provides a schematic block diagram of a sequence of timer queue snapshots and the group of corresponding time out events in the queue at these different times. A time line 302 illustrates how various time out events from the storage area network fill these set of time slots and are processed over time. To provide the scalability and performance needed, one implementation of the present invention uses a singly linked circular queue to accommodate the set of time slots described above. Each entry in the singly linked circular queue corresponds to a different time slot in the set of time slots and is capable of holding one or more time out events. In this exemplary implementation of the present invention as illustrated, doubly linked circular queues hold each of the one or more time out events at each time slot.

Initially, a timer queue 304 illustrated in FIG. 3 has a "top of queue" (TOQ) identifier marking the current time position and a time interval 306 separating each time slot entry in the set of time slots of the singly linked circular queue. In this example, the timer queue 304 operates with a 0.5 second time interval 306 and at time t0 initially has no scheduled timer events. The actual time intervals between each time slot are implemented in software routines and are proportional to a hardware timer clock frequency as will be described in further detail later herein. For example, the granularity of time interval 306 can most practically be made as small as the hardware timer clock frequency and as large as feasible given the timing and performance requirements of the storage area network being monitored for time out events.

As time passes according to time line 302, time out events may be added, removed or may time out. The timer queue snapshot at time t1 indicates that time out events "A" and "B" are added to the queue after approximately 1 second has elapsed. In the illustrated example, time out event "A" is specified to have a time out interval of 4 seconds and is therefore placed at an offset of 8 intervals from the TOQ since each interval is equivalent to a ½ second; similarly, since out event "B" is specified to have a time out interval of 5 seconds it occupies an offset of 10 intervals from the TOQ. Both time out event "A" and time out event "B" are the only entries in each of the respective doubly linked circular queues at their respective time intervals.

Additional time out events "C", "D" and "E" are added at time t2 to timer queue 304 after approximately 2 seconds have elapsed and the TOQ has advanced two more time intervals along the singly linked list circular queue. In this example, time out event "D" is entered at an offset of 12 time intervals (6 seconds) from the current TOQ while time out event "C" is entered at an offset of 8 time intervals (4 seconds) from the current TOQ and time out event "E" is added at 6 time intervals (3 seconds). Time out event "E" and time out event "C" are added to a doubly linked circular queue at the respective time intervals in the singly linked circular queues as other time out events also occupy the same time slots.

Similar time out events are added at time t3 when a little less than 2.5 seconds have elapsed. Specifically, time out events "F" and "G" are added to timer queue 304 at offsets of 8 time intervals (4 seconds) and 10 time intervals (5 seconds) respectively from the current TOQ position. Time out event "F" is added to the doubly linked circular queue along with other time out events while time out event "G" is the only entry in the double linked circular queue at the corresponding time slot.

Time out event "A" and time out event "C" are removed from timer queue 304 without timing out on or before time t4 and at an elapsed time of over 3 seconds along time line 302. This typically indicates that the corresponding event "A" and event "C" completed processing successfully. Additional time out events "H" and "I" are added to timer queue 304 at time t4 at offsets of 6 time intervals (3 seconds) and 8 time intervals (4 seconds) respectfully. Numerous additional time out events "E", "B", "H" and "G" are also removed from timer queue 304 without timing out on or before time t5 and approximately over 4 seconds along time line 302.

By the time 6 seconds along time line 302 have elapsed at time t6, time out event "F" added originally at time t3 has timed out and is removed 308. The time out event associated with time out event "F" is detected because the TOQ for timer queue 304 has advanced and coincided with the time slot and doubly linked circular queue holding time out event "F". As will be described in further detail later herein, a time out handler registered with time out event "F" is invoked to handle the post-processing and release of resources when this particular time out event occurs. Other time out events other than time out event "F" may use the same or different time out handlers depending on the type of time out processing required.

Figure 4:
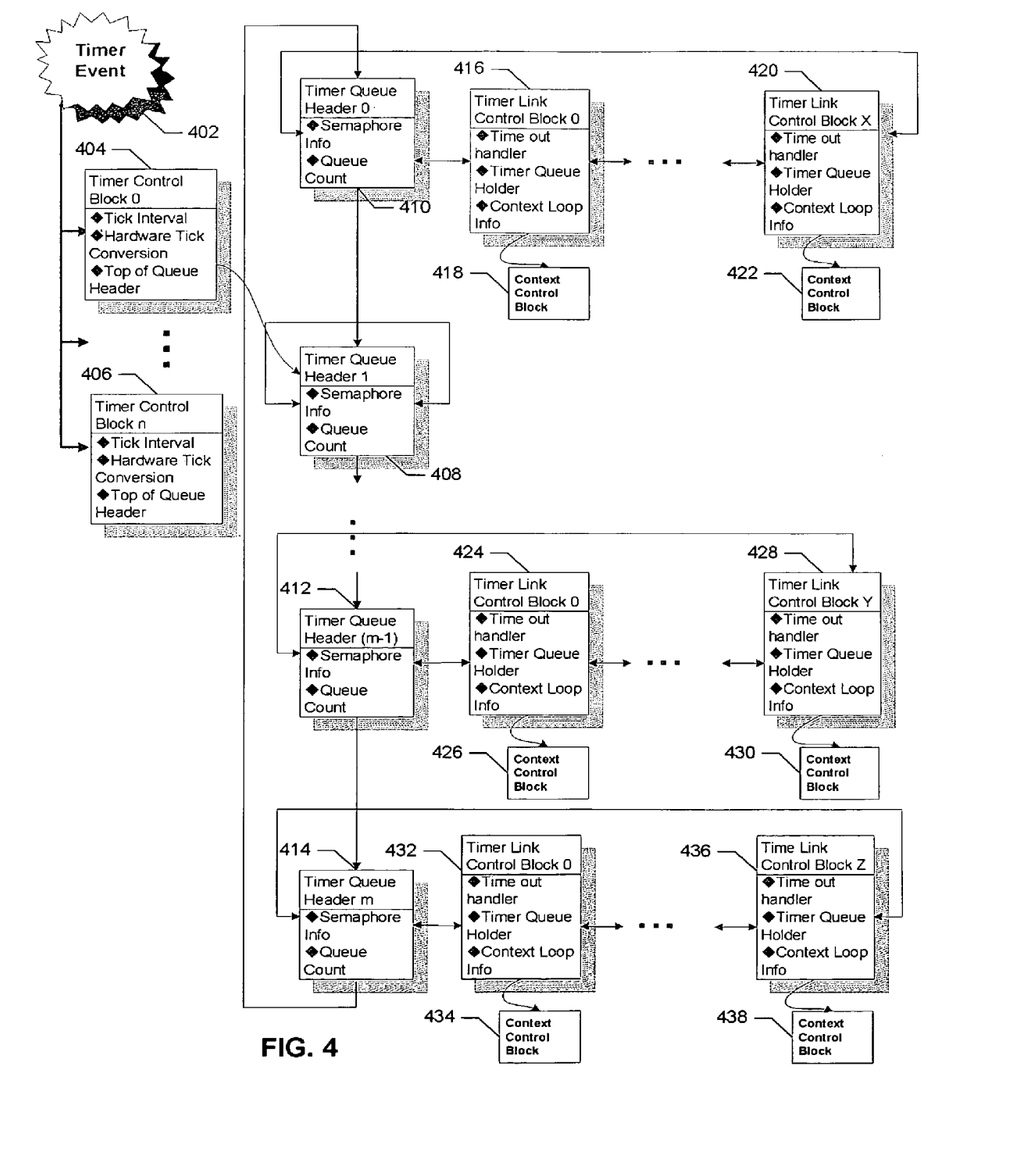
FIG. 4 is a block diagram illustration of the data structures associated with a timer queue designed in accordance with one implementation of the present invention.

FIG. 4 is a block diagram illustration of the data structures associated with a timer queue designed in accordance with implementations of the present invention. In this example, a timer event 402 occurs and services a series of timer queues corresponding to a timer control block 0 404 and up to and including time control block n 406. Multiple timer queues enable a system to handle varying timer granularities and time out events using these granularities. Details of each timer queue contained in the respective timer control block includes a "Tick Interval" and a "Hardware Tick Conversion" to facilitate converting a hardware clock frequency to the particular timer interval used in the time slots of the timer queue. Additional entries may also include the "Top of Queue (TOQ)" to facilitate identifying the current time out position in the timer queue and processing of time out events. In this example in FIG. 4, only entries for the timer queue associated with timer control block 0 404 are illustrated even though multiple timer control blocks are shown.

The corresponding set of timer queues have timer queue header 0 410, timer queue header 1 408 up to and including timer queue header (m–1) 412 and timer queue header m 414. Each timer queue header contains further information regarding the timer queue entries including a "Queue Count" to enumerate the current number of entries in the associated doubly linked circular queue and "Semaphore Info" for performing mutually exclusive operations on the queue in a multi-threaded processing environment. In one illustrated instance of the timer queue, timer queue header 1 408 has a pointer that points back to itself indicating that the time slot and corresponding doubly linked circular queue has no time out events to monitor and is currently empty.

In contrast, timer queue header 0 410 includes time out events identified by timer link control block 0 416 up to and including timer link control block X 420. Each of these timer link control blocks corresponds to a different time out event being monitored at the time slot associated with timer queue header 0 410. Context control block 418 up to and including context control block 422 are specified along with corresponding time out interval and time out handler or callback function when each time out event is added to the timer queue for monitoring.

If the "Top of Queue (TOQ)" entry in timer control block 0 404 points to a timer queue header with entries like timer queue header 0 410 then the associated time out events corresponding to the time link control blocks are considered timed out and processed accordingly. "Time Out Handler" specified in timer link control block 0 416 specifies a process to perform time out post-processing and management of resources. Generally, the time out event specifies a callback or time out handler to then process the timed-out event and other time out related processing.

Other portions of the timer queue associated with timer control block 0 404 are processed similarly. In this example, timer queue header (m–1) 412 also has timer link control block 0 424 up to and including timer link control block Y 428 with corresponding context control block 426 up to and including context control block 430. Similarly, timer queue header m 414 also has timer link control block 0 432 up to and including timer link control block Z 436 along with context control blocks 434 through 438. These timer link control blocks indicate that the doubly linked circular queue at this time slot is non-empty and may be subject to a time-out event.

Figure 5:
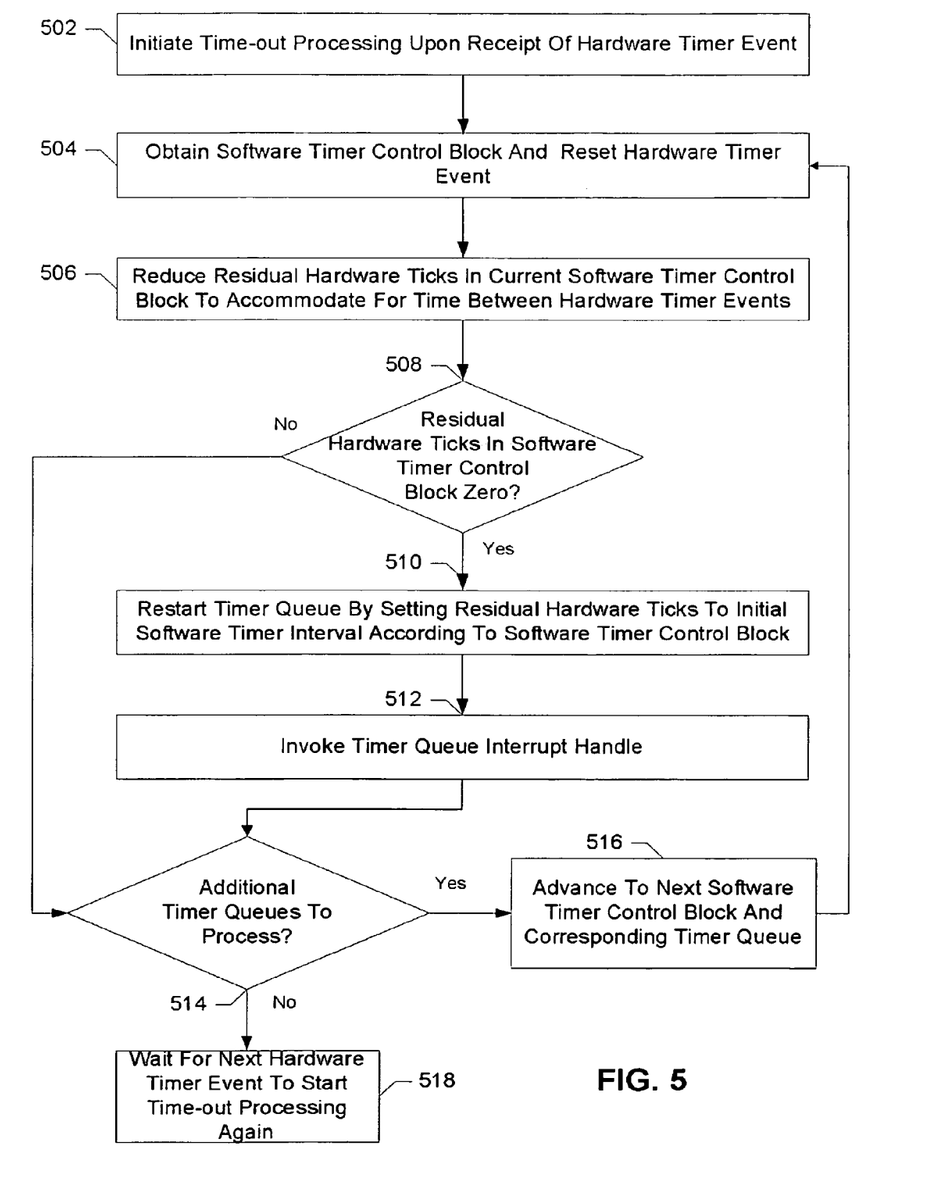
FIG. 5 is a flowchart diagram of the operations for processing time out events in accordance with one implementation of the present invention.

FIG. 5 is a flowchart diagram of the operations for initiating a time out event in accordance with one implementation of the present invention. These operations preface the processing of individual timer queues keyed off the hardware clock frequency built into a system. Instead of using a single time interval, implementations of the present invention instead allow for multiple timer queues with different time intervals between each time slot.

Time-out processing is initiated upon receipt of hardware timer event (502). Because the hardware timer event is generally not coincident with the timer queue intervals, adjustments between the time interval in the timer queue and the hardware timer are needed. To start, one implementation of the present invention obtains software timer control block and resets the hardware timer event (504). The software timer control block provides information describing the relationship between the frequency of the hardware timer events and the time interval for the particular timer queue. Resetting the hardware timer event prepares the system to receive subsequent hardware timer events.

Based on the information above, the present invention decrements the residual hardware ticks in current software timer control block to accommodate for elapsed time between hardware timer events (506). Residual hardware ticks keep track of the difference in time between the hardware timer or hardware clock frequency and the time interval for the particular timer queue. These residual hardware ticks are reduced each hardware timer event down to the time interval for the timer queue.

If residual hardware ticks remain in the software timer control block (508) no time out operations are performed as the timer interval for the timer queue has not been met. Accordingly, if additional timer queues exists (514) then processing continues with the next software timer control block and timer queue in the system (516). In the event there are no further timer queues and software timer control blocks, processing delays or waits until the next hardware timer event to begin processing previously described once again.

Alternatively, when the residual hardware ticks are decremented to zero (508) then it is time to consider whether an event being monitored has timed out. First, the residual hardware ticks are set to an initial value according to the software timer control block and software timer interval for the timer queue (510). This prepares the timer queue to process a subsequent hardware timer event once the current processing is completed. Next, a timer queue interrupt handler is invoked to process the particular timer queue to determine if there is presently an event that has timed out (512).

Figure 6:
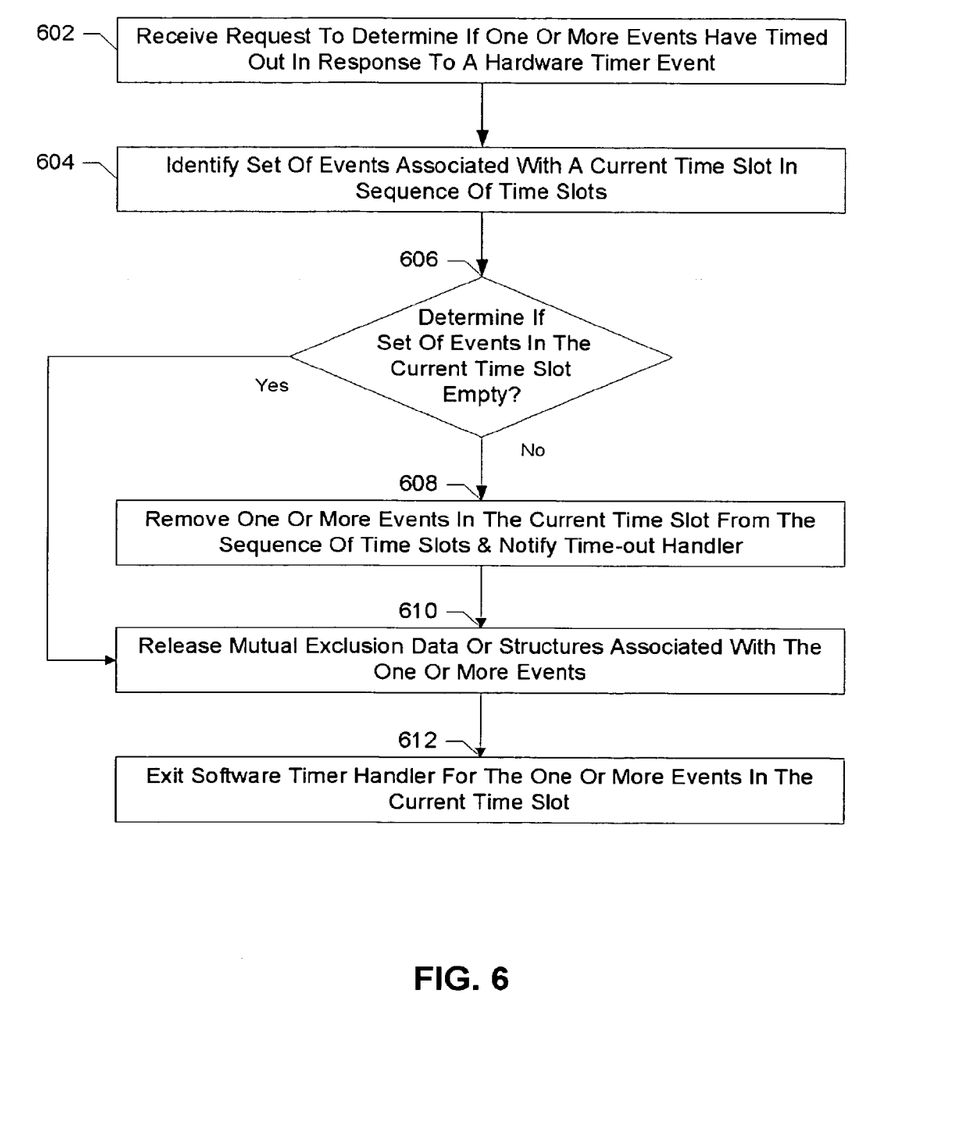
FIG. 6 is another flowchart diagram of the operations to determine if an event has timed out in accordance with one implementation of the present invention.

FIG. 6 is another flowchart diagram of the operations to determine if an event has timed out in accordance with one implementation of the present invention. As previously described with respect to FIG. 5, an initial request is made when the residual hardware ticks are decremented to zero to determine if one or more events have timed out in response to a hardware timer event (602). These operations determine a time out occurs at some multiple of the hardware events depending on the desired granularity used for monitoring the time out events. For example, a time interval of 0.5 seconds used in the timer queue to check for a time out may be many times the frequency of the hardware timer events.

Next, a current time slot in sequence of time slots identifies a set of events, if any exists, in a time slot set to expire (604). In one implementation and as previously described, the time slots are implemented as sequence of time slots using a singly linked circular queue data structure. Further, identifying the current time slot in the sequence of time slots is achieved more efficiently by storing and retrieving a top of queue (TOQ) identifier. The TOQ points to the current position in the timer queue and is used to directly and efficiently access a current timer link control block. When the set of events in the current time slot is empty (606) implementations of the present invention release semaphores or other mutual exclusion mechanisms (610) needed for processing the time out events in the timer queue. Once processing is completed under either circumstance described above, the software handler performing the above operations terminates and awaits for subsequent events for further processing (612).

Figure 7:
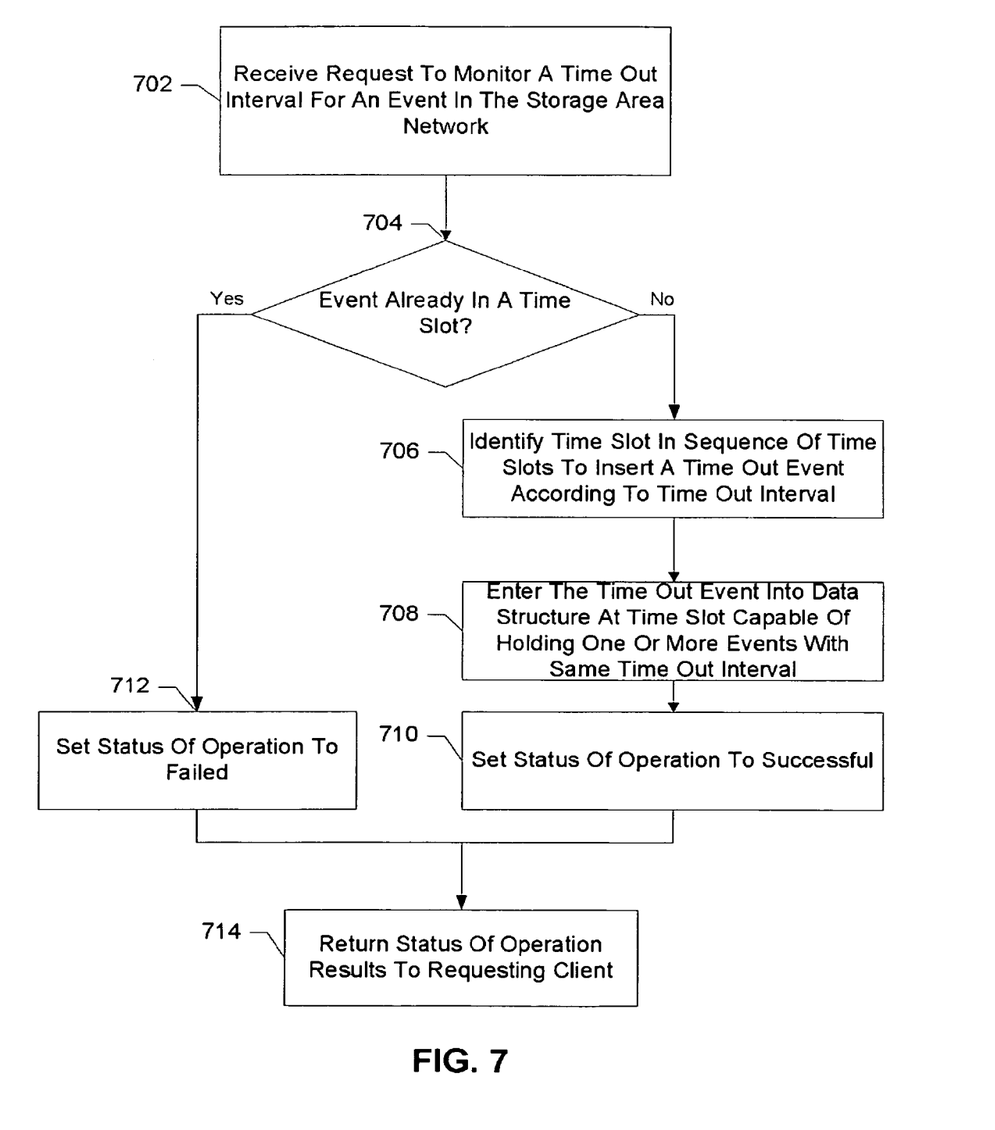
FIG. 7 is a flowchart diagram provides the operations for entering a time out event into a timer queue in accordance with one implementation of the present invention.

Referring now to FIG. 7, a flowchart diagram provides the operations for entering a time out event into a timer queue in accordance with one implementation of the present invention. Typically, a request to monitor a time out interval for an event in the storage area network is received from an application or monitor on the storage area network (702). In one implementation, the application performing a storage related event on the storage area network makes the request and specifies an expected timed out period for the event, a callback or time out handler and a context for tracking particulars about the event. Implementations of the present invention do not grant a request to monitor an event if the event has already been entered in a time slot (704). In this case, the process will be terminated and fail with the appropriate error code (712).

Based on the specified time out period, implementations of the present invention identify a time slot in the sequence of time slots to insert the time out event (706). One or more timer queues may be considered to receive the time out event based on the different the time intervals and granularity of time used in each timer queue. For example, a 4 second time out period for the time out event could be inserted in a timer queue having 1 second time intervals while a 2.5 second time out period may fit more appropriately in a timer queue having 0.5 second time intervals. Within the timer queue, the actual time slot selected to receive the time out event depends on the relative offset to the top of queue (TOQ) indicator. For example, a 4 second time out period in a timer queue of 0.5 time intervals would be placed 8 time slots ahead of the TOQ indicator since the TOQ indicator would advance in 0.5 second increments to the 8$^{th}$ time slot in the subsequent 4 seconds.

The current time out event is entered into a pre-allocated timer queue header data structure at time slot (708). Provided a doubly linked circular queue, the current event could be added to the head of the doubly linked circular queue, the end of the queue or elsewhere in the queue to organize the time out events in the more desirable or efficient manner under the circumstances; status of the operation is identified as successful (710). The doubly linked circular queue is advantageous as time out events can be removed with minimal efforts regardless of its position in the queue. At the end of the time out event entry, the time out handler returns status of operation results to the requesting client (714).

Figure 8:
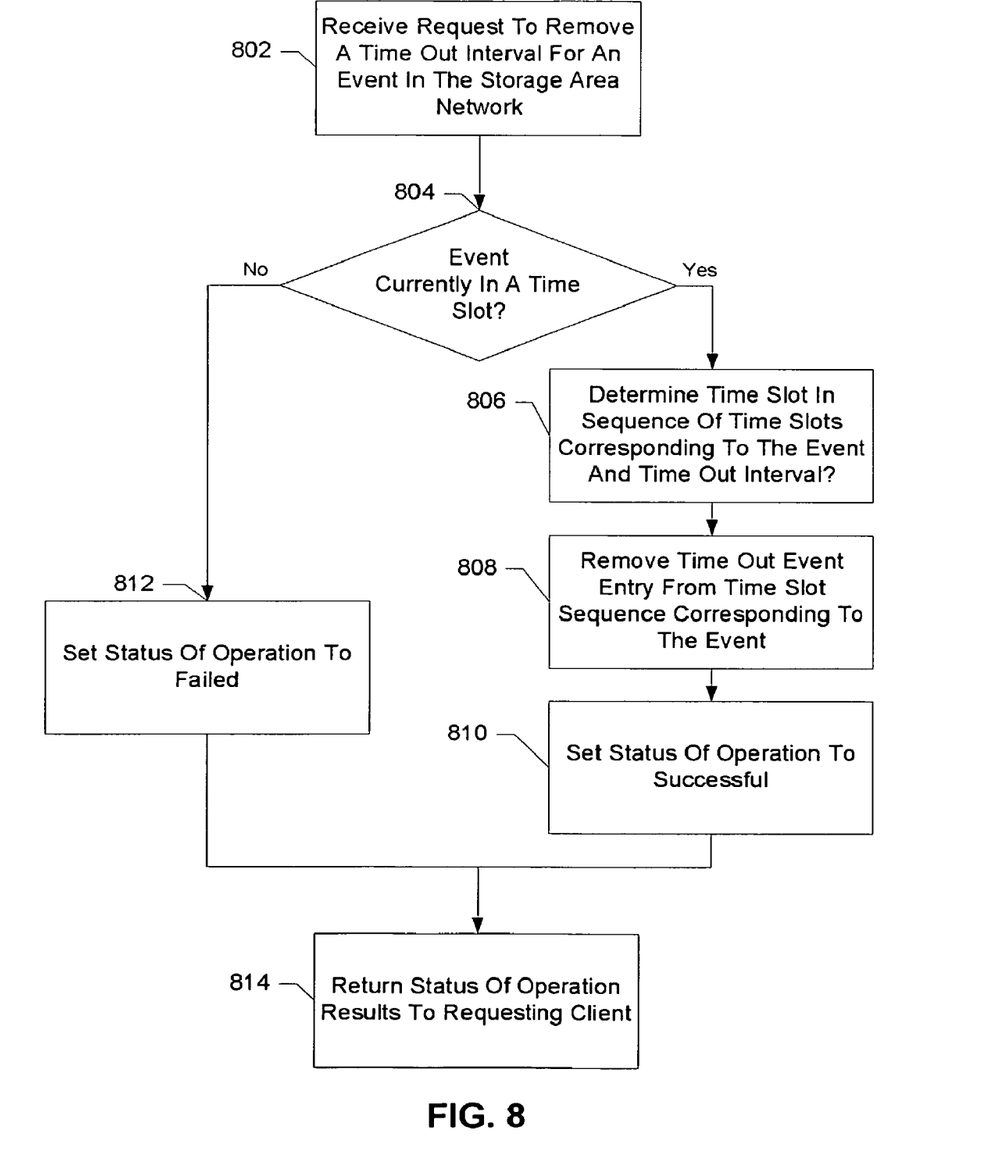
FIG. 8 is yet another flowchart diagram of the operations for removing a time out event from a timer queue in accordance with one implementation of the present invention.

FIG. 8 is a yet another flowchart diagram of the operations for removing a time out event from a timer queue in accordance with one implementation of the present invention. These operations are generally performed if an operation in the storage area network completes successfully and prior to the time out period elapsing for the particular event. Accordingly, the request to remove a time out interval for an event in the storage area network occurs on or about the time the event in the storage area network has completed (802). In one instance, the request could be to remove a single time out event or multiple time out events associated depending on the number of events being monitored.

Implementation of the present invention grants the request only if the event has been added in one time slot (804). Otherwise, the process will be terminated with the appropriate error code (812).

The first step to removing the time out event involves determining the time slot in sequence of time slots corresponding to the event and time out interval (806). One approach to identifying this time slot in a sequence of time slots for the particular timer queue uses the context associated with the timer event. The context could also specify both the time slot and an offset or pointer directly into the area of the data structure used to store the time out event. For example, a pointer to the timer link control block holding the particular time out event.

Once the time out event is identified, the time out event can be removed from the time slot sequence corresponding to the event (808). For example, a time out handler function can readily remove the time out event using the context and pointer into the data structure used to store the time out event. Removing one time out event from the time slot sequence does not affect other time out events in the same slot. These other time out events in the slot sequence continue to be monitored in case their time out intervals elapse. At the end of the time out event removal, the time out handler returns status of operation results to requesting client (814). This could include a integer or character string indicating the status of the event or a pointer to the data structure holding details of the time out event and the context of the time out event.

Figure 9:
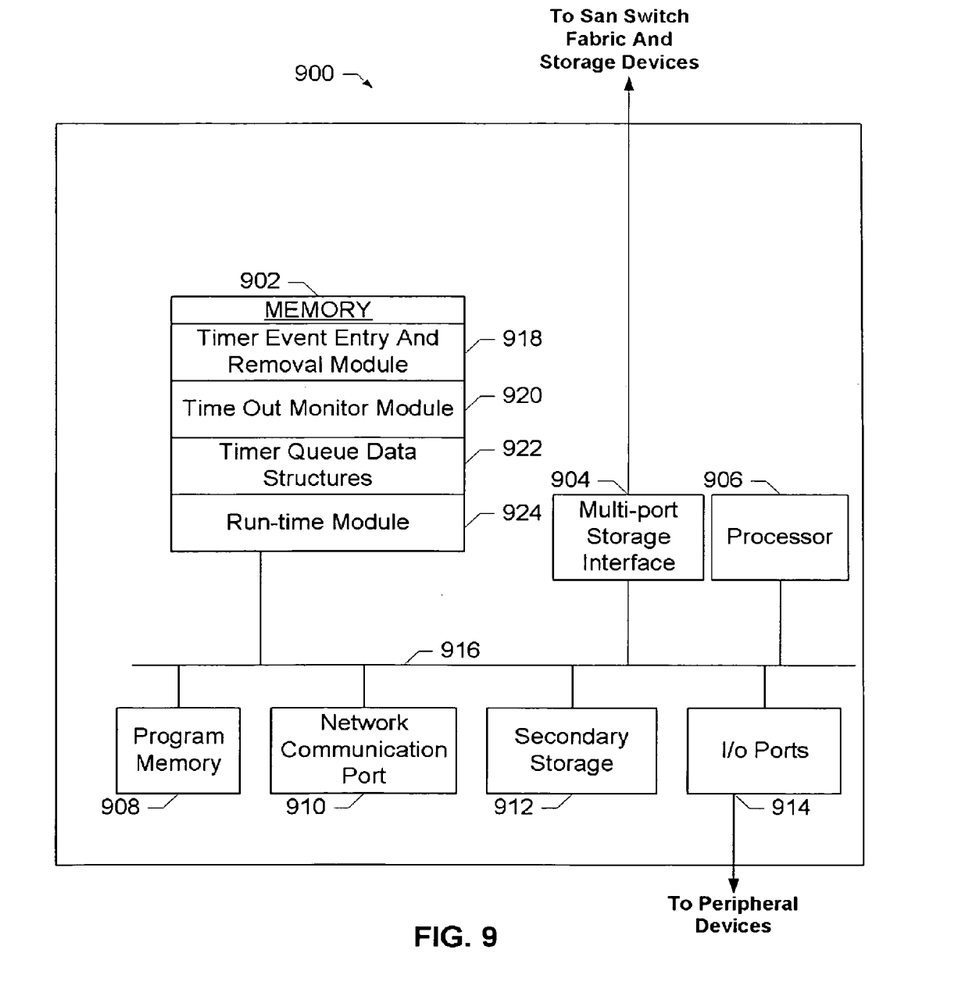
FIG. 9 provides one implementation of the present invention as it would be implemented in a computer device or system.

FIG. 9 provides one implementation of the present invention as it would be implemented in a computer device or system. In this example, system 900 includes a memory 902, typically random access memory (RAM), a multiport storage interface 904, a processor 906, a program memory 908 (for example, a programmable read-only memory (ROM) such as a flash ROM), a network communication port 910 as an alternate communication path, a secondary storage 912, and I/O ports 914 operatively coupled together over interconnect 916. System 900 can be preprogrammed, in ROM, for example using a microcode or it can be programmed (and reprogrammed) by loading a program from another source (for example, from a floppy disk, a CD-ROM, or another computer) and preferably operates using real-time operating system constraints.

Memory 902 includes various components useful in implementing aspects of the present invention. These components include a timer event entry and removal module 918, a time out monitor module 920 and timer queue data structures 920 managed using a run-time module 924.

Timer event entry and removal module 918 implements the operations for both entering and removing time events on the one or more timer queues as described above. In one implementation, these operations provide an interface to both singly linked circular queues and doubly linked circular queues in a manner that provides high performance, scalability and reliability. Semaphores and other mutual exclusion operations allow timer event entry and removal module 918 to operate on the time queues without causing data corruption or inconsistent or unexpected results.

In one implementation, timer queue data structures 920 includes both the singly linked circular queues and the doubly linked circular queues described previously and used to hold the various time out events. Finally, run-time module 924 manages the resources used to perform these and other operations described above and ensures smooth overall operating characteristics.

In general, implementations of the invention can be implemented in digital electronic circuitry, or in computer hardware, firmware, software, or in combinations of them. Apparatus of the invention can be implemented in a computer program product tangibly embodied in a machine readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high level procedural or object oriented programming language, or in assembly or machine language if desired; and in any case, the language can be a compiled or interpreted language. Suitable processors include, by way of example, both general and special purpose microprocessors. Generally, the processor receives instructions and data from a read only memory and/or a random access memory. Also, a computer will include one or more secondary storage or mass storage devices for storing data files; such devices include magnetic disks, such as internal hard disks and removable disks; magneto optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto optical disks; and CD ROM disks. Any of the foregoing can be supplemented by, or incorporated in, ASICs (application specific integrated circuits).

While specific implementations have been described herein for purposes of illustration, various modifications may be made without departing from the spirit and scope of the invention. For example, implementations of the present invention are described as being used by SAN system using distributed storage virtualization controllers however it can also be be used for managing time out events on other distributed systems including distributed network controllers, distributed computing controllers, and other distributed computing products and environments. Accordingly, the invention is not limited to the above-described implementations, but instead is defined by the appended claims in light of their full scope of equivalents. From the foregoing it will be appreciated that the storage virtualization controller arrangement, system, and methods provided by the present invention represent a significant advance in the art. Although several specific implementations of the invention have been described and illustrated, the invention is not limited to the specific methods, forms, or arrangements of parts so described and illustrated. For example, the invention is not limited to storage systems that use SCSI storage devices, nor to networks utilizing fibre channel protocol. This description of the invention should be understood to include all novel and non-obvious combinations of elements described herein, and claims may be presented in this or a later application to any novel and non-obvious combination of these elements. The foregoing implementations are illustrative, and no single feature or element is essential to all possible combinations that may be claimed in this or a later application. Unless otherwise specified, steps of a method claim need not be performed in the order specified. The invention is not limited to the above-described implementations, but instead is defined by the appended claims in light of their full scope of equivalents. Where the claims recite "a" or "a first" element of the equivalent thereof, such claims should be understood to include incorporation of one or more such elements, neither requiring nor excluding two or more such elements.

What is claimed is:

1. A method of entering a time out interval for an event in a storage area network, comprising:

identifying a time slot in a sequence of time slots to insert a time out event for the event in the storage area network;

determining if other events in the storage network already have corresponding other time out events in the time slot; and inserting the time out event for the event in the identified time slot grouped together with other time out events corresponding to other events in response to the determination.

2. The method of claim 1 wherein identifying the time slot for the time out event, further comprises:

determining a time interval between each time slot in the sequence of time slots; and selecting the time slot at an offset in the sequence of time slots based upon a multiple of the time intervals and the corresponding time out interval.

3. The method of claim 1 wherein the time interval between each time slot is proportional to a hardware timer clock frequency.

4. The method of claim 1 wherein the sequence of time slots to insert a time out event is implemented using a singly linked circular queue data structure.

5. The method of claim 4 further including identifying a current time slot in the sequence of time slots using a top of queue identifier.

6. The method of claim 5 further comprising:

moving to a subsequent time slot by advancing the top of queue identifier to a subsequent entry in the singly linked circular queue data structure each time a time interval corresponding to the time between each time slot elapses.

7. The method of claim 1 wherein the inserting further comprises organizing the time out event for the event along with the other time out events for the other events in the identified time slot in order of insertion using a doubly linked circular queue data structure.

8. The method of claim 7 wherein determining if other time out events are in the same time slot further comprises traversing the doubly linked circular queue associated with the time slot and attributing each entry in the doubly linked circular queue with at least one other time out event being monitored on the storage area network.

9. The method of claim 8 wherein an empty doubly linked circular queue associated with the time slot indicates that no other time out events in the storage area network are being monitored during that time slot.

10. A method of removing a time out event being monitored for an event in a storage area network, comprising:
receiving a request to remove the time out event corresponding to an event in the storage area network;
identifying a time slot in a sequence of time slots to remove the time out event for the event in the storage area network; and
removing the time out event for the event in the identified time slot while any other time out events and other corresponding events grouped together in the identified time slot continue being monitored.

11. The method of claim 10 wherein identifying the time slot for the time out event, further comprises:
receiving a time out event indicator corresponding to the selected time slot in the sequence of time slots and time out event originally selected based upon information stored in an event context.

12. The method of claim 10 wherein the sequence of time slots to insert a time out event is implemented using a singly linked circular queue data structure.

13. The method of claim 12 further including identifying a current time slot in the sequence of time slots using a top of queue identifier.

14. A method of monitoring time out intervals for events in a storage area network comprising:
receiving a request to determine if one or more events in the storage area network have timed out;
identifying a set of events associated with a current time slot in a sequence of time slots;
determining if the identified set of events in the current time slot is empty;
removing one or more events from the identified set of events grouped together in the current time slot in response to the determination; and
notifying a time-out handler associated with each of the one more events removed from the time slot to perform appropriate time-out related processing.

15. The method of claim 14 wherein the received request occurs in response to the elapse of a time interval.

16. The method of claim 15 wherein the time interval is proportional to a hardware timer clock frequency.

17. The method of claim 14 wherein the current time slot in the sequence of time slots is identified using a top of queue identifier that advances to a subsequent time slot each time a time interval elapses.

18. The method of claim 14 wherein the set of events associated with a current time slot in a sequence of time slots is implemented using a singly linked circular queue data structure.

19. The method of claim 14 further including identifying a current time slot in the sequence of time slots using a top of queue identifier.

20. The method of claim 14 wherein removing the one or more events from the identified set of events further comprises traversing a doubly linked circular queue associated with the time slot and removing each event entry in the doubly linked circular queue due to the expiration of the time out interval for each event entry.

21. An apparatus of entering a time out interval for an event in a storage area network, comprising:
a processor that executes instructions;
a memory containing instructions when executed on the processor that identify a time slot in a sequence of time slots to insert a time out event for the event in the storage area network, determine if other events in the storage network already have corresponding other time out events in the time slot and insert the time out event for the event in the identified time slot grouped together with other time out events corresponding to other events in response to the determination.

22. The apparatus of claim 21 wherein the instructions that identify the time slot for the time out event, further comprise instructions that determine a time interval between each time slot in the sequence of time slots and select the time slot at an offset in the sequence of time slots based upon a multiple of the time intervals and the corresponding time out interval.

23. The apparatus of claim 21 wherein the sequence of time slots to insert a time out event is implemented using instructions that operate on a singly linked circular queue data structure.

24. The apparatus of claim 23 further including instructions that identify a current time slot in the sequence of time slots using a top of queue identifier.

25. The apparatus of claim 24 further comprising instructions that move to a subsequent time slot by advancing the top of queue identifier to a subsequent entry in the singly linked circular queue data structure each time a time interval corresponding to the time between each time slot elapses.

26. The apparatus of claim 21 wherein the insert instructions further comprises instructions that organize the time out event for the event along with the other time out events for the other events in the identified time slot in order of insertion using a doubly linked circular queue data structure.

27. An apparatus for removing a time out event being monitored for an event in a storage area network, comprising:
a processor that executes instructions;
a memory containing instructions when executed on the processor receive a request to remove the time out event corresponding to an event in the storage area network, identify a time slot in a sequence of time slots to remove the time out event for the event in the storage area network and remove the time out event for the event in the identified time slot while any other time out events and other corresponding events grouped together in the identified time slot continue being monitored.

28. The apparatus of claim 27 wherein the instructions that identify the time slot for the time out event, further comprise instructions that receive a time out event indicator corresponding to the selected time slot in the sequence of time slots and time out event originally selected based upon information stored in an event context.

29. The apparatus of claim 27 wherein the instructions that use the sequence of time slots to insert a time out event is implemented with instructions that operate using a singly linked circular queue data structure.

30. The apparatus of claim 29 further including instructions that identify a current time slot in the sequence of time slots using a top of queue identifier.

31. An apparatus for monitoring time out intervals for events in a storage area network comprising:
- a processor that executes instructions;
- a memory containing instructions when executed on the processor receive a request to determine if one or more events in the storage area network have timed out, identify a set of events associated with a current time slot in a sequence of time slots, determine if the identified set of events in the current time slot is empty, remove one or more events from the identified set of events grouped together in the current time slot in response to the determination and notify a time-out handler associated with each of the one more events removed from the time slot to perform appropriate time-out related processing.

32. The apparatus of claim 31 wherein the instructions receive the request in response to the elapse of a time interval.

33. The apparatus of claim 31 wherein the instruction that identifies the current time slot in the sequence of time slots uses a top of queue identifier that advances to a subsequent time slot each time a time interval elapses.

34. The apparatus of claim 31 wherein the set of events associated with a current time slot in a sequence of time slots is implemented using instructions that operate on a singly linked circular queue data structure.

35. The apparatus of claim 31 wherein the instructions that remove the one or more events from the identified set of events further comprises instructions that traverse a doubly linked circular queue associated with the time slot and removing each event entry in the doubly linked circular queue due to the expiration of the time out interval for each event entry.

36. An apparatus for entering a time out interval for an event in a storage area network for processing on a processor, comprising:
- means for identifying a time slot in a sequence of time slots to insert a time out event for the event in the storage area network;
- means for determining if other events in the storage network already have corresponding other time out events in the time slot; and
- means for inserting the time out event for the event in the identified time slot grouped together with other time out events corresponding to other events in response to the determination.

37. An apparatus for removing a time out event being monitored for an event in a storage area network for processing on a processor, comprising:
- means for receiving a request to remove the time out event corresponding to an event in the storage area network;
- means for identifying a time slot in a sequence of time slots to remove the time out event for the event in the storage area network; and
- means for removing the time out event for the event in the identified time slot while any other time out events and other corresponding events grouped together in the identified time slot continue being monitored.

38. An apparatus for monitoring time out intervals for events in a storage area network for processing on a processor, comprising:
- means for receiving a request to determine if one or more events in the storage area network have timed out;
- means for identifying a set of events associated with a current time slot in a sequence of time slots;
- means for determining if the identified set of events in the current time slot is empty;
- means for removing one or more events from the identified set of events grouped together in the current time slot in response to the determination; and
- means for notifying a time-out handler associated with each of the one more events removed from the time slot to perform appropriate time-out related processing.

* * * * *